UNITED STATES PATENT OFFICE.

STEPHEN L. GOODALE, OF SACO, MAINE.

MANUFACTURE OF FOOD EXTRACT OF FISH.

SPECIFICATION forming part of Letters Patent No. 248,586, dated October 25, 1881.

Application filed December 23, 1880. (No specimens.)

*To all whom it may concern:*

Be it known that I, STEPHEN L. GOODALE, of Saco, in the county of York and State of Maine, have invented a new and useful Improvement in the Manufacture of Food Extract of Fish, of which the following is a specification.

My invention relates to an improved process of manufacturing the food extract from the juices of fish, described in Letters Patent No. 171,662, granted to me January 4, 1876; and it consists in a peculiar method or process of treating the juices of fish for the purpose of extracting or removing therefrom a peculiar constituent of the flesh-juices of fish, which apparently causes their turbidity or translucency, as compared with the clearness or transparency of the flesh-juices of beef.

When the flesh-juices of beef have been extracted in the way usually practiced in making "Liebig's meat extract"—the albumen contained therein having been coagulated and removed—the liquid is clear and transparent, and may immediately be evaporated and yield an extract which, when dissolved in hot water, gives a clear solution; but when the flesh-juices of fish are similarly treated the liquid is not clear, but translucent or slightly turbid, and if immediately evaporated yield an extract which gives a turbid solution.

In applying my invention to practical use, the recently-caught menhaden, shad, mackerel, alewives, or other suitable fish are cleaned or dressed, all undesirable portions being removed, and the reserved portions are then boiled for a short time in water to coagulate the albumen contained in the muscle-juices. The liquid is then separated from the solid matter by drainage and pressure, and the liquid is allowed to stand in a suitable vessel until any oil which may have passed over in the liquid has risen to the surface. When the oil has all risen to the surface and the liquid, freed from oil, has been placed in a suitable vessel, it is ready for the application of my improved process. This consists in aeration at the highest practicable temperature, either by introducing a current of heated air or of heated steam, or by ebullition with free access of air, or other equivalent manner, whereby or following which there takes place a precipitation of the above-mentioned substance. The complete precipitation of this matter can be ascertained by examining samples taken out from time to time in a glass tube or beaker. When the precipitation is completed the liquid will be found clear and transparent, or will quickly become so if any of the precipitate is suspended in it, and will not remain continuously turbid, as before. If, however, gelatine be present in the liquid, which will be the case if skin and bones were not excluded in cleaning the fish, the precipitate will be finer and less obviously crystalline in structure and slower in falling than if muscular flesh alone were used. The liquor will also have attained a somewhat darker color, resembling that of light wine, and be reduced in bulk by the partial concentration incident to the means used to effect precipitation. When the precipitation is completed the precipitate is to be wholly removed from the liquid, which may be effected either by allowing it to fall to the bottom, followed by decantation or drawing off, or by filtration in any convenient manner. The clear liquid thus obtained is then ready for evaporation, as is customary in making meat extracts, (preferably *in vacuo*,) the evaporation to be continued until the desired consistence is reached, which is usually about that of honey.

The special novelty and usefulness of my invention consists in the discovery, precipitation, and removal from fish-juices of the matter causing turbidity—a substance not described in the books—detrimental by its presence in such juices to the manufacture of an acceptable extract therefrom, being a complex, nitrogenous, and alkaline earthy substance found therein, and which is believed to cause their turbidity, and to impart or to contribute to the peculiar taste of fish as distinguished from meat. By its removal the extract, when dissolved, furnishes a clear solution much more attractive in appearance and improved in taste.

What I claim as new, and desire to secure by Letters Patent of the United States, is—

1. The method herein described of improving the quality of food extract made from the juices of fish, which consists in precipitating and removing from said juices the nitrogenous alkaline earthy matter contained therein, substantially as and for the purposes described.

2. In the manufacture of food extract of fish, the process of removing therefrom a nitrogenous alkaline earthy matter contained therein, which consists in aerating at elevated temperature the fish-juices separated from the solid matter until said nitrogenous alkaline earthy matter is precipitated, and the removal of the same from the liquid, substantially as described.

Executed at Boston, Massachusetts, this 21st day of December, A. D. 1880.

STEPHEN L. GOODALE.

Witnesses:
W. E. LOMBARD,
E. E. CHANDLER.